United States Patent [19]

Faust

[11] Patent Number: 4,704,499

[45] Date of Patent: Nov. 3, 1987

[54] LOCKING MECHANISM FOR AERIAL CABLE CLOSURE AND TERMINALS

[75] Inventor: Carl W. Faust, Dover, N.J.

[73] Assignee: American Telephone and Telegraph Company AT&T Bell Laboratories, Murray Hill, N.J.

[21] Appl. No.: 875,713

[22] Filed: Jun. 18, 1986

[51] Int. Cl.⁴ ............................................. H02G 15/08
[52] U.S. Cl. ........................................ 174/92; 174/41; 174/65 G; 174/93
[58] Field of Search ..................... 174/91, 92, 93, 41, 174/65 G

[56] References Cited

U.S. PATENT DOCUMENTS

| | | | |
|---|---|---|---|
| 3,701,835 | 10/1972 | Eisele et al. | 174/92 X |
| 3,757,031 | 9/1973 | Izraeli | 174/138 F |
| 3,796,823 | 3/1974 | Wright et al. | 174/92 |
| 3,823,254 | 7/1974 | Smith | 174/92 |
| 3,836,694 | 9/1974 | Kapell | 174/92 X |
| 3,836,696 | 9/1974 | Gressitt et al. | 174/41 |
| 3,926,141 | 12/1975 | Taylor | 174/92 X |
| 3,971,894 | 7/1976 | Faust et al. | 174/41 |
| 4,032,212 | 6/1977 | Faust et al. | 339/109 |
| 4,049,357 | 9/1977 | Hamisch, Jr. | 403/209 |
| 4,232,184 | 11/1980 | Faust | 174/92 |
| 4,262,167 | 4/1981 | Bossard et al. | 174/92 |
| 4,262,168 | 4/1981 | Bossard | 174/92 X |
| 4,387,268 | 6/1983 | Morel et al. | 174/92 |
| 4,390,744 | 6/1983 | Suffi et al. | 174/93 X |

FOREIGN PATENT DOCUMENTS

| | | | |
|---|---|---|---|
| 225770 | 2/1965 | Fed. Rep. of Germany . | |
| 1440082 | 2/1969 | Fed. Rep. of Germany . | |
| 2247253 | 3/1974 | Fed. Rep. of Germany | 174/91 |
| 137682 | 10/1979 | Japan | 174/41 |
| 833480 | 4/1960 | United Kingdom . | |

Primary Examiner—Morris H. Nimmo
Attorney, Agent, or Firm—Jack S. Cubert

[57] ABSTRACT

A boot, or adapter, for an aerial cable or terminal housing is made from hard material in two halves. The two halves are fastened, or hinged, at one longitudinal edge by a eye-hook-like device and at the other longitudinal edge by a snap lock device. An end surface has a plurality of concentric plates which may be snapped out to allow a cable to pass through the boot. The space between the boot and the cable is filled with a compliant, synthetic material.

8 Claims, 9 Drawing Figures

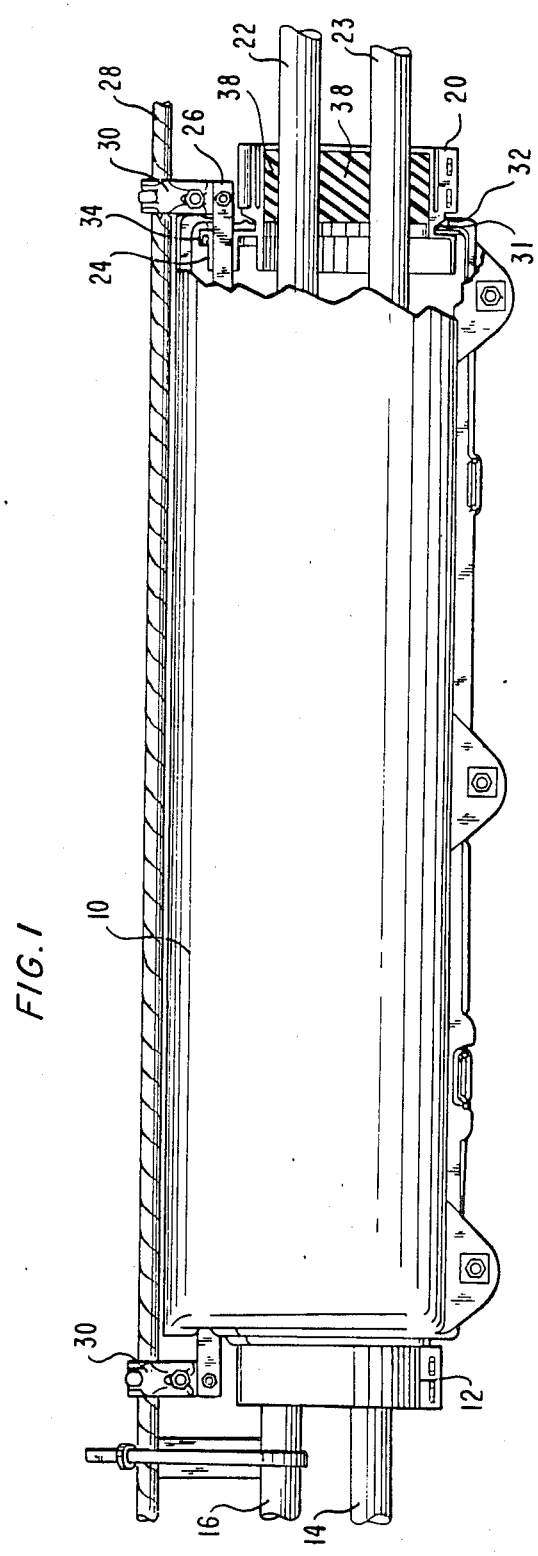

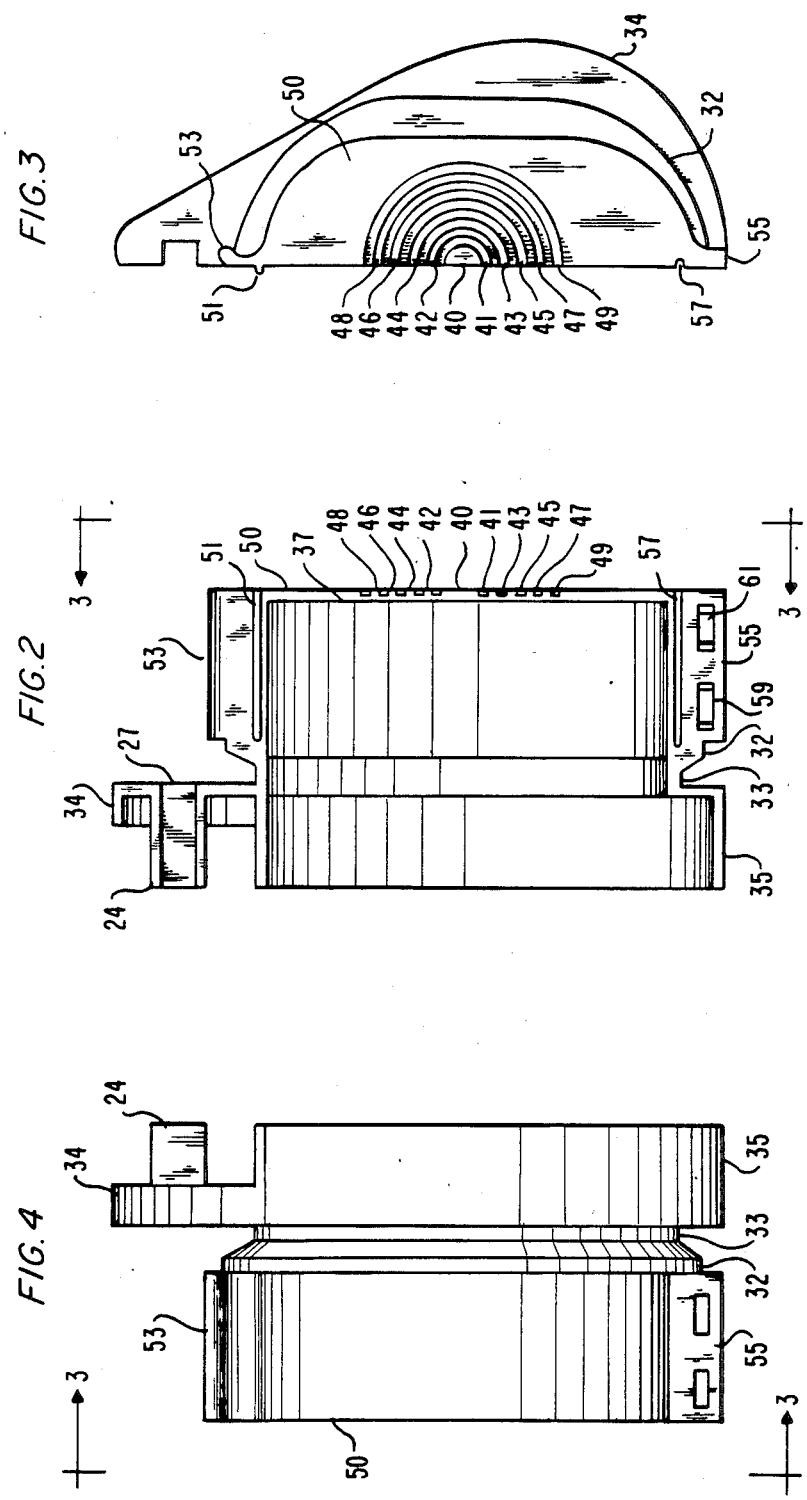

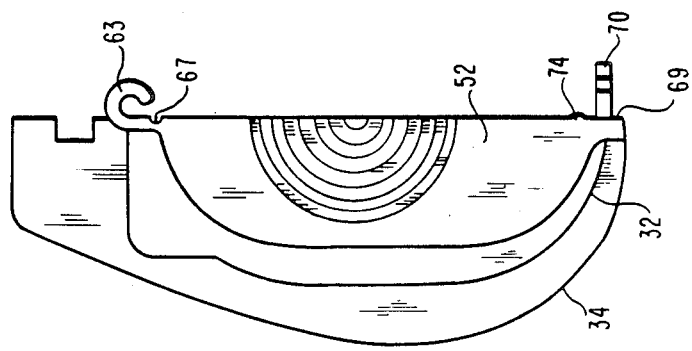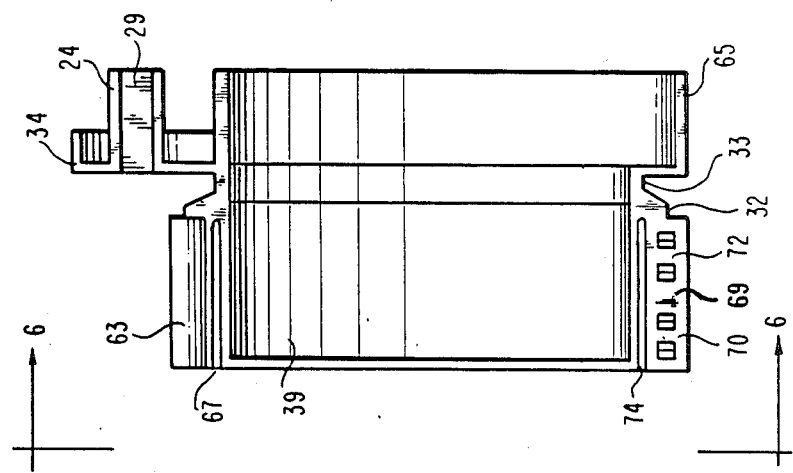

LOCKING MECHANISM FOR AERIAL CABLE CLOSURE AND TERMINALS

TECHNICAL FIELD

This invention relatess to aerial telephone terminals and closures and, in particular, to a locking mechanism for aerial terminals and closures.

BACKGROUND OF THE INVENTION

In U.S. Pat. No. 4,232,184 which was issued to me on Nov. 04, 1980, I show a cable adapter, commonly referred to in the trade as a boot, for use with a cable closure at each of its ends in aerial telephone plant. The cable closure protects a cable splice. Likewise, some aerial cable terminals may use a boot at each end. The terminal provides a location for terminating a loop.

The boot which I have described in the aforesaid patent has a plurality of tapered nozzles for adapting to the size of the cable. Initially, the boot was made of soft material. But rodents could eat through the soft material, exposing the cable to elements and resulting in potential maintenance problems. An improved boot was made from a hard substance. This, however, made it difficult for a craftperson to work with the apparatus.

SUMMARY OF THE INVENTION

The aforesaid problems are solved by making the boot in two halves from hard material. The upper edge of a first half has an eye-hook-like device formed integrally with the half and runs longitudinally along the half. The upper edge of the second half has a rod-like device which is formed integrally with the half and runs longitudinally along the half for mating with the eye-hook-like device. The lower edge of the first half has a plurality of dual prongs which are spaced at predetermined intervals along a tab running longitudinally along the lower edge of the first half. The lower edge of the second half has a plurality of apertures at intervals corresponding to the aforesaid dual prongs for mating therewith, formed through a tab running longitudinally along the lower edge of the second half.

In order to prevent contaminants from entering the interior of the boot, the inner surfaces of the two halves have longitudinally formed ridges and mating troughs offset from the upper and lower edges.

One end of the boot has a flat surface on which one or more sets of substantially concentric perforations are made. This permits a craftperson to push out material along the perforations so as to conform the boot to the size of the aerial cable.

The other end of the boot has two substantially concentric spaced apart ridges to permit one end of a housing for either an aerial cable terminal or an aerial cable closure to be lodged therewithin. The first ridge is bigger than the second and fits withiin the housing. It is preferable that the shape of the first ridge conform to the contour of the inner surface of the housing for improved stability of the boot.

After a boot has been installed around one or more aerial cables, a compliant material is inserted within the space between the aerial cable and the boot. The compliant material is formed from a synthetic material, such as foam rubber, and is shaped to conform to the inner surface of the boot. The compliant material has one or more sets of substantially concentric circles cut therethrough, leaving a few areas where the material adhere together. The compliant material has a longitudinal cut to permit access to the inner layers of the material for the removal of one or more innermost layers of compliant material. Thereafter, the compliant material is placed around one or more cables as a jacket, filling the space between the cables and the inner surface of the boot.

The advantages of this invention are many. Because the material is hard, rodents are deterred from damaging the boot. A craftperson, furthermore, finds the boot easy to use because it is made in two halves which are assembled easily and locked into place. The pair of ridges and mating troughs prevent contaminants from entering the boot. The compliant material which is packed into the space between the aerial cable and the boot also prevents contaminants from entering the boot.

BRIEF DESCRIPTION OF THE DRAWING

FIG. 1 shows the boot assembled with a cable closure housing;

FIGS. 2, 3 and 4 show elevational and end views of one half of the boot of FIG. 1;

FIGS. 5 and 6 show elevational and end views of the other half of the boot of FIG. 1;

DETAILED DESCRIPTION

Figure 8:
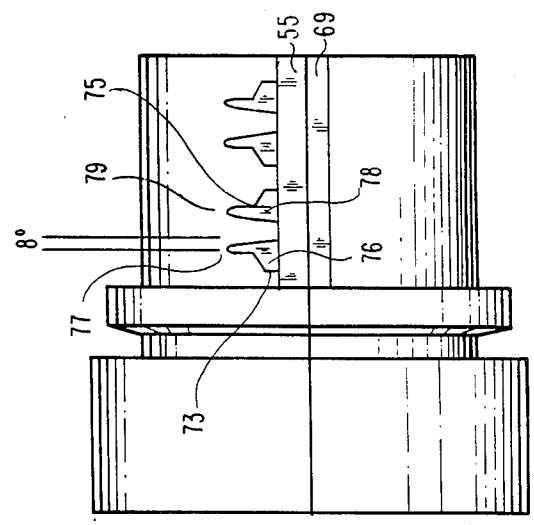
FIGS. 7 and 8 show the two halves being assembled and being held in place by the dual prongs.

Referring to FIG. 1, there is shown housing 10 which is an aerial cable closure having a boot 12 at one end thereof to provide the function of an adapter for cables 14 and 16. Housing 10, likewise, has a boot 20 at the other end to provide the function of an adapter for a pair of cables 22 and 23. Boot 20 is shown in partial section to expose details thereof. Boot 20, and likewise boot 12, may be made to receive one or more cables. Although boot 20 is shown being used with an aerial closure, it could also be used with an aerial terminal (not shown).

Boot 20 shows a receptacle 24 which receives grounding bar 26 from housing 10. Grounding bar 26 is connected to cable strand 28 by way of strand adapter 30 as shown more clearly in U.S. Pat. No. 4,032,212 granted June 28, 1977 to Mr. Arnold R. Smith and me.

Boot 20 has ridges 32 and 34, seen more clearly in FIGS. 2, 3 and 4, formed on the exterior surface of boot 20 adjacent to housing 10. These two ridges 32 and 34 have a predetermined space 33 therebetween to receive end 31 of housing 10. The function of securing boot 20 to housing 10 is similar to that shown more clearly in U.S. Pat. No. 3,836,696 granted Sept. 17, 1974 to Messrs. T. J. Gressitt et al and the teaching of installing the boot in the housing is incorporated herein by reference.

The space between cables 22 and 23 and boot 20 is filled with a compliant material 38 which, in the preferred embodiment, is made synthetically. The manner in which the compliant material is filled within boot 20 will be described hereinbelow with reference to FIG. 9.

Referring to FIG. 2, there is shown an elevational view of one half of boot 20. FIG. 3 shows an end view of this half. FIG. 4 shows the view of the boot in FIG. 2 when it is flipped over to expose details on its exterior surface. This is the half which is seen in FIG. 1. The elevational and end views of the other half are shown in FIGS. 5 and 6, respectively; this half is not seen in FIG. 1.

Referring more closely to FIGS. 2 and 4, there is shown space 33 between exterior ridges 32 and 34. End 31 of housing 10 is seated within annular space 33. Projection 35 together with its counterpart 65 in FIG. 5 form a hollow cylinder which is seated within housing 10 and provides added structural support for boot 20. Space 27 in FIG. 2 together with its counterpart 29 in FIG. 5 provides a conduit for grounding bar 26 of FIG. 1. Chamber 37 in FIG. 2 along with its counterpart 39 in FIG. 5 form a cavity through which one or more cables pass and the remaining space if filled with compliant material 38 as shown in FIG. 1 and will be described more fully with reference to FIG. 9 hereinbelow.

Referring to FIG. 3, end plate 50 is shown having a plurality of concentric perforations 41, 43, 45, 47 and 49 yielding annular plates 40, 42, 44, 46 and 48 which may be removed selectively so that end plate 50 has an aperture the size of the cable to pass therethrough. FIG. 6 shows corresponding structure.

Referring to FIGS. 2 and 3 together, there is shown a longitudinal ridge 51 which runs along the length of the inner surface of the half of boot 20 and formed integrally therewith. There is shown a rod-like member 53 running along the upper edge of the half of boot 20 and formed integrally therewith.

The lower edge of the half of the boot 20 has a longitudinal cavity 57 running along the inner surface thereof. This lower edge of the boot half also has a tab or flap 55 having a plurality of apertures 59 and 61. Further details of these apertures 59 and 61 will be shown hereinbelow with reference to FIGS. 7 and 8.

Referring now to FIGS. 5 and 6, there are shown the details for the half of boot 20 which is not shown in FIG. 1. This half of boot 20 mates with the half of boot 20 shown in FIGS. 2 and 3. There are shown the exterior ridges 32 and 34 with the space 33 therebetween to capture the end 31 of housing 10. Projecting member 65 together with projecting member 35 of FIG. 2 form a hollow cylinder which projects into housing 10 and is used to support boot 20 within housing 10. In the preferred embodiment, the hollow cylinder conforms to the contour of the inner surface of housing 10. Channel 29 together with channel 27 of FIG. 2 defines a conduit through which passes grounding bar 26.

The upper edge of the half has a longitudinal eye-hook-like member 63 in FIG. 6. This member recieves the rod-like member 53 of FIGS. 2 and 3 to form a locking means or hinge at that upper edge. Eye-hook member 63 is formed integrally with the rest of the half by some suitable means like molding. A recess 67 also runs longitudinally along this upper edge of the half. Recess 67 receives ridge 51 of FIGS. 2 and 3 and acts as a seal to prevent contaminants from entering the interior cavity of boot 20.

There is a flap or tab 69 at the other end of the half of boot 20 formed integrally therewith. Flap 69 has a plurality of dual prongs 70 and 72, further details of which are shown with reference to FIGS. 7 and 8 hereinbelow. At this end, there is shown ridge 74 running longitudinally along the inner surface of the half of boot 20 and formed integrally therewith. Ridge 74 is seated within cavity 57 of FIGS. 2 and 3 to form a second seal, thereby providing the function of preventing contaminants from entering the interior of boot 20.

End plate 52, like plate 50 of FIGS. 2 and 3, has a plurality of concentric perforations producing a plurality of annular plates which may be removed to conform to the size of the cable. Although end plates 50 and 52 show only one set of end plates, more than one set may be provided.

Figure 7:
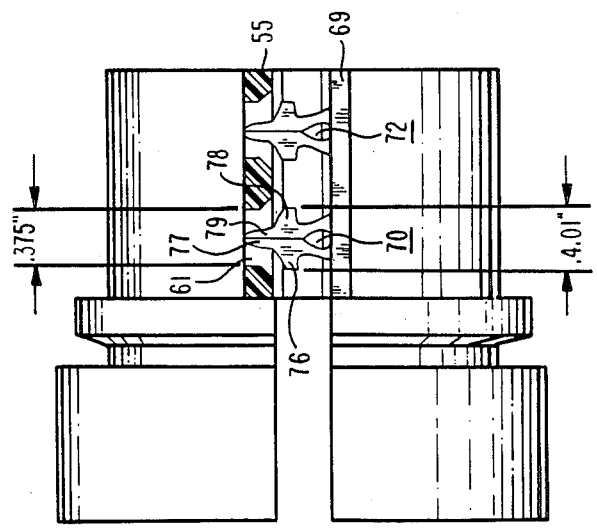

Dual prongs 70 and 72 mate with corresponding apertures 59 and 61 of FIGS. 2 and 3 to form a second locking means for boot 20. Referring now to FIGS. 7 and 8, there are shown the details of dual prongs 70, 72 and corresponding apertures 61, 59. Dual prongs 70, illustrative of the other, has elements 76 and 78. Elements 76 and 78 have long noses 77 and 79, respectively, and sloping shoulders 73 and 75. When long noses 77 and 79 are brought together, the maximum width of the ends of the shoulders 73 and 75 measure about 0.401 inch, in the preferred embodiment. The width of the corresponding aperture 61, however, measures only about 0.375 inch. These dimensions are illustrative of the preferred embodiment although other dimensions may be used for different embodiments. The aforesaid difference in dimensions between dual prongs 70 and aperture 61 is sufficient to retain the two halves of boot together after elements 76 and 78 of dual prong 70 have been snapped through aperture 61.

When elements 76 and 78 of dual prongs 70 are brought near aperture 61 with a view towards locking the two halves of boot 20, a pair of beveled surfaces within aperture 61 make contact with beveled shoulders 73 and 75, forcing prongs 76 and 78 forwards and towards each other. Manually applied force to tabs 69 and 55 causes prongs 76 and 78 to be snapped through aperture 61. Dual prongs 70 penetrate aperture 61 because both are made from elastic materials which yield to manually applied pressure and because the sides of the shoulders are formed at a slope of eight degrees with the vertical as shown in FIG. 8. After the shoulders 73 and 75 fo dual prongs 70 are snapped through aperture 61, they clear the tab 55 and spring loose where they are retained because of the aforesaid difference in dimensions. Long noses 77 and 79 may be brought together by a pair of pliers and tabs 55 and 69 pried apart by a screw driver in order to open boot 20.

Figure 9:
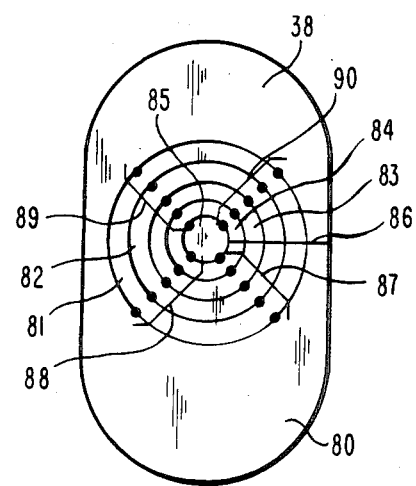
FIG. 9 shows the compliant material for use with the boot.

Referring now to FIG. 9, there is shown the compliant material described with reference to FIG. 1 hereinabove as element 38. The material is formed so as to fill the space within chamber 37 formed by the two halves of boot 20 and surround one or more cables. The material provides the function of a seal against ingress of water and other contaminants within boot 20 and housing 10. A plurality of concentric perforations through the material is made to yield the annular members 80, 81, 82, 83, 84 and 85 which are connected to each other at positions 87, 88, 89 and 90. A radial perforation 86 is made through all the annular members. One or more centrally located annular members are removed so as to permit a cable to pass through compliant material 38 the size of the cable. Thereafter, the compliant member 38 is separated at radial perforation 86 to be placed around a cable within the space between the cable and the inner chamber 37 of boot 20 formed by the two halves. Although compliant material 38 is shown for one cable, more than one such set of perforations may be made with ease.

What is claimed is:

1. Apparatus for preventing moisture and other contaminants from entering a cable housing, said apparatus comprising first and second halves, each half having first and second longitudinal edges, and selectively removable means along a first end surface of said apparatus for permitting at least one cable to pass therethrough, the first longitudinal edge of the first half comprising a member having an eye hook shape cross-section running along the first longitudinal edge, the first longitudinal edge of the second half comprising a member having a rod shape cross-section running along the first longitudinal edge, said rod shaped cross section member running along the first longitudinal edge of the second half being inserted into the eye hook shaped cross-section member running along the first longitudinal edge of the second half to lock the first longitudinal edges of the first and second halves.

2. The apparatus of claim 1 wherein the second longitudinal edge of the first half comprises a tab member which includes a plurality of apertures spaced at predetermined intervals along said tab member.

the second longitudinal edge of the second half comprises a tab member having a plurality of projections substantially aligned with said apertures at said predetermined intervals when said first and second halves are assembled, each rectangular aperture having beveled surfaces, each projection comprising spaced first and second prongs, each prong having a sloped shoulder section spaced from the tab member and contacting one of the beveled surfaces of said rectangular aperture, and a long nose section extending outward from the sloped shoulder section, the sloped shoulder sections directing the prongs toward each other to snap the spaced prongs through the rectangular aperture for locking the second longitudinal edges of the first and second halves and the long nose sections directing the spaced prongs toward each other to disengage the locked second longitudinal edges of the first and second halves.

3. Apparatus having at least one cable passing therethrough for preventing moisture and other contaminants from entering a cable housing, said apparatus comprising first and second halves each having first and second longitudinal edges, said first and second halves forming a first inner chamber when assembled for permitting at least one cable to pass through said inner chamber, first means for securing said first and second halves along the first longitudinal edges of said first and second halves, second means for securing said first and second halves along the second longitudinal edges of said first and second halves, selectively removable means along a first end surface of said apparatus so as to permit at least one cable to pass therethrough, and means made from a synthetic material for filling the space surrounding the cable within said first inner chamber so as to prevent passage of contaminants through said apparatus, the outer surface of said synthetic material conforming to the contour of the inner surface of said first chamber, said synthetic material having at least one set of concentric perforations cut therethrough defining a plurality of annular layers which are secured to each other at predetermined intervals, and each set having at least one radial perforation so as to permit removal of one or more selected ones of said annular layers.

4. The apparatus of claim 3 wherein said first securing means comprises an eye-hook shaped cross-section member integral with and running along the first longitudinal edge of said first half, and a rod shaped cross-section member integral with and running along the first longitudinal edge of said second half for insertion into the eye-hook shaped cross-section member running along the first longitudinal edge of said first half to lock said first and second halves at their first longitudinal edges.

5. The apparatus of claim 4 wherein the second securing means comprises a tab integral with and running longitudinally along the second longitudinal edge of said second half including a plurality of apertures spaced at predetermined intervals along said tab, and a tab integral with and running along the second longitudinal edge of said first half, a plurality of projections spaced at intervals along said second longitudinal edge of said first half, each projection being substantially aligned with said apertures when said first and second halves are assembled, each projection comprising first and second prongs, having oppositely sloped shoulder sections spaced apart and outward from the tab member to snap into said rectangular aperture to lock said second longitudinal edges of the first and second halves, and a long nose section extending outward from the sloped shoulder section for directing the spaced prongs toward each other when said second longitudinal edges are locked to disengage the second longitudinal edges of the first and second halves.

6. The apparatus of claim 5 wherein said second half comprises a first ridge running longitudinally along its inner surface and spaced apart from the aforesaid rod shaped cross-section member and projecting outwardly from said second half, and said first half comrises a first trough running longitudinally along its surface and spaced apart from the aforesaid eye-hook shaped cross-section member, said first ridge mating with said first trough when said first and second halves are assembled.

7. The apparatus of claim 6 wherein said first half comprises a second ridge running longitudinally along its inner surface and spaced apart from said plurality of spaced apart prong projections and projecting outwardly from said first half, and said second half having a second trough running longitudinally along its surface and spaced apart from the aforesaid tab having a plurality of apertures, said second ridge mating with said second trough when said first and second halves are assembled.

8. Apparatus having at least one cable passing therethrough for preventing moisture and other contaminants from entering a housing for said at least one cable, said apparatus comprising:

a first end having one or more end plates, each end plate having a plurality of perforations, said perforations defining a plurality of selectively removable sections to permit one of said cables to pass therethrough, a compliant synthetic material for filling the space between said inner surface of said apparatus and said one or more cables comprising an outer surface which is shaped to conform to the contour of the inner surface of the apparatus, a plurality of perforations cut through the compliant material to define a plurality of selectively removable annular layers, said layers being joined to one another at predetermined intervals, and a radial perforation through all of said layers, providing access to said layers for their selective removal and for installing said material as a jacket around said at least one cable.

* * * * *